(12) United States Patent
Zhang et al.

(10) Patent No.: US 10,055,002 B2
(45) Date of Patent: Aug. 21, 2018

(54) SYSTEM AND METHOD FOR ENERGY EFFICIENT POWER SAVING ON MULTIFUNCTION DEVICES

(71) Applicants: Kabushiki Kaisha Toshiba, Minato-ku (JP); Toshiba TEC Kabushiki Kaisha, Shinagawa-ku (JP)

(72) Inventors: Jia Zhang, Irvine, CA (US); Michael L. Yeung, Mission Viejo, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 21 days.

(21) Appl. No.: 15/134,140

(22) Filed: Apr. 20, 2016

(65) Prior Publication Data

US 2017/0308151 A1    Oct. 26, 2017

(51) Int. Cl.
*G06F 1/00*    (2006.01)
*G06F 1/32*    (2006.01)
*H04L 12/26*   (2006.01)

(52) U.S. Cl.
CPC .......... *G06F 1/3284* (2013.01); *G06F 1/3287* (2013.01); *H04L 43/08* (2013.01)

(58) Field of Classification Search
CPC ....... G06F 1/3284; G06F 1/3287; H04L 43/08
See application file for complete search history.

(56) References Cited

U.S. PATENT DOCUMENTS

| | | | |
|---|---|---|---|
| 2010/0077241 A1* | 3/2010 | Piazza | G06F 1/3209 713/320 |
| 2013/0083346 A1* | 4/2013 | Fujiki | G03G 15/5004 358/1.13 |

* cited by examiner

*Primary Examiner* — Austin Hicks
(74) *Attorney, Agent, or Firm* — Ulmer & Berne LLP

(57) ABSTRACT

A document processing system includes a power scheduling server configured to receive time-based usage data from a multifunction device. In response to receiving the usage data from the multifunction device, the power scheduling server analyzes the usage data and determines a power saving policy for the multifunction device. The power scheduling server transmits the power saving policy to the multifunction device. The multifunction device performs changes of operational state based on usage and in accordance with the received power saving policy.

6 Claims, 6 Drawing Sheets

FIG. 6

SYSTEM AND METHOD FOR ENERGY EFFICIENT POWER SAVING ON MULTIFUNCTION DEVICES

TECHNICAL FIELD

Example embodiments of this application relates generally to setting energy efficient power saving policies on multifunction devices. The application has particular utility in connection with receiving usage data from multifunction devices and sending a customized power saving package to each multifunction devices based on anticipated future usage.

BACKGROUND

Document processing devices are in widespread use in many businesses and academic settings. Such devices include copiers, scanners, printers and facsimile machines. Today, one or more functions associated with such devices are combined in a single unit, referred to as a multifunction peripheral ("MFP") or multifunction device ("MFD"). MFPs are typically network connected to allow users to print remotely from their computers, scan documents that can be sent to a user's computer or a third party's computer (for example via email), copy documents, or fax documents to other people.

Efficient use of energy reduces operating costs. In MFPs, the main use of energy is in heating the toner fuser mechanism to a high enough temperature to melt the toner. The fuser is used to melt toner particles so that the toner adheres to a media substrate such as printer paper. In the normal or awake mode of an MFP, the fuser of the printer is kept warm so there is little to no waiting period from the time a print job is submitted to when the printer can begin printing.

In order to save energy, MFPs typically are configured to go into energy saving sleep or deep sleep modes if there no activity on the MFP within a threshold, or pre-determined, period of time. In these energy saving modes, the printers turn off the fuser heating element to reduce power consumption. MFP manufacturers typically set a unified default time period on MFPs which can be modified by a system administrator. However, system administrators often are not familiar with the usage of individual MFPs, the usage of which can vary based on the users who use each MFP. If the sleep timer is configured for too short of a period of time, it can inconvenience users who have to wait for an MFP to warm up before printing. If the sleep time is set for too long of a period of time, energy is unnecessarily wasted by the MFP.

SUMMARY

In accordance with an example embodiment of the subject application, a document processing device includes an embedded controller having a processor, memory, and a network interface. The memory stores data and instructions. The network interface is configured for data communication with a power scheduling server via a network associated with the document processing device and the power scheduling server. The processor is configured to store a log of usage data associated with use of the document processing device, such as scanning, faxing, and/or printing. The processor transmits, via the network interface, the usage data to the power scheduling server. In response, the processor receives an updated power saving policy from the power scheduling server that is based, at least in part, on the usage data sent to the power scheduling server. The processor executes the power saving policy. The power saving policy is used by the processor to set the operational state of the document processing device based on usage. The processor performs a change in operational state based on the usage in accordance with the power saving policy. The operational state can be an awake operational state, a sleep operational state, or a deep sleep operational state. The power saving policy can also be based upon calendar information, for example events imported from a company calendar such as a holiday, a company holiday, a day of the week such as an indication that a particular day is a weekday or weekend day, and employee specific schedule information such as when typical users of a particular MFP are scheduled to be out of the office or off work. The log of usage date can be in the form of entries indicating whether or not the document processing device was used in each of 24 hour time slots. The usage data can include time-stamped entries.

In accordance with another example embodiment, a method includes receiving usage data associated with a document processing device by a power scheduling server. The method includes stored the usage data of the document processing device by the power scheduling server. The method includes analyzing the usage data over an interval of time by the power scheduling server to determine a pattern of usage of the document processing device. The method includes generating a power saving policy based, at least in part, on the determined patter of usage. The power saving policy can also be based upon other data including information imported from a company calendar, for example holidays, days of the week, and employee schedules. The method includes transmitting the power saving policy to the document processing device. The method can also include the execution of the power saving policy by the document processing device and setting the operation state of the document processing device based on usage and in accordance with the power saving policy. The interval of time used in analyzing the usage data can be a weekly, based on a month of usage or a calendar month, approximately thirty days, approximately ninety days or any other suitable interval of time. The usage data can be based on whether the document processing device was used in each time slot of a day that is divided into 24 hour time slots. The power saving policy can include rules that are based upon hourly time slots and that have a per hour granularity. Each rule can set the operational state of the document processing device to the state of awake, sleep, or deep sleep in accordance with current and/or past usage of the document processing device. Each rule can be based upon usage in the current time slot, or the current time slot and one or more previous time slots.

In accordance with another example embodiment, a document processing system can include a power scheduling server and a multifunction device. The power scheduling server receives time-based usage data from the multifunction device over a network, stores the usage data for an interval of time, and analyzes the usage data over the interval of time to determine a pattern of usage. The usage data can be based on daily usage divided into 24 hours of time slots. The interval of time can be weekly, monthly, a calendar month, approximately thirty days, approximately ninety days, or any other suitable interval of time. The power scheduling server generates a power saving policy based at least in part on the determined pattern of usage. The power scheduling server can also import calendar data such as holiday, company holiday, day of the week, and employee schedule data, and generate the power saving policy based on the imported calendar data. The power scheduling server transmits the generated power saving policy to the multifunction device via the network. The multifunction device transmits usage date to the power scheduling server, and in response receives the generated power saving policy. The multifunction device executes the power saving policy. The power saving policy determines the operational state of the multifunction device based on usage. Based on usage, the multifunction device performs a change of operational stage in accordance with the power saving policy. The power saving policy can include rules that have per hour granularity, for example using the same 24 hour time slots as the usage data. Each rule can set the operational state of the document processing device to an awake state, a sleep state, or a deep sleep state.

BRIEF DESCRIPTION OF THE DRAWINGS

Various embodiments will become better understood with regard to the following description, appended claims and accompanying drawings wherein:

FIG. 6 is an example administrator interface screen for configuring a power scheduling policy.

DETAILED DESCRIPTION

Figure 1:
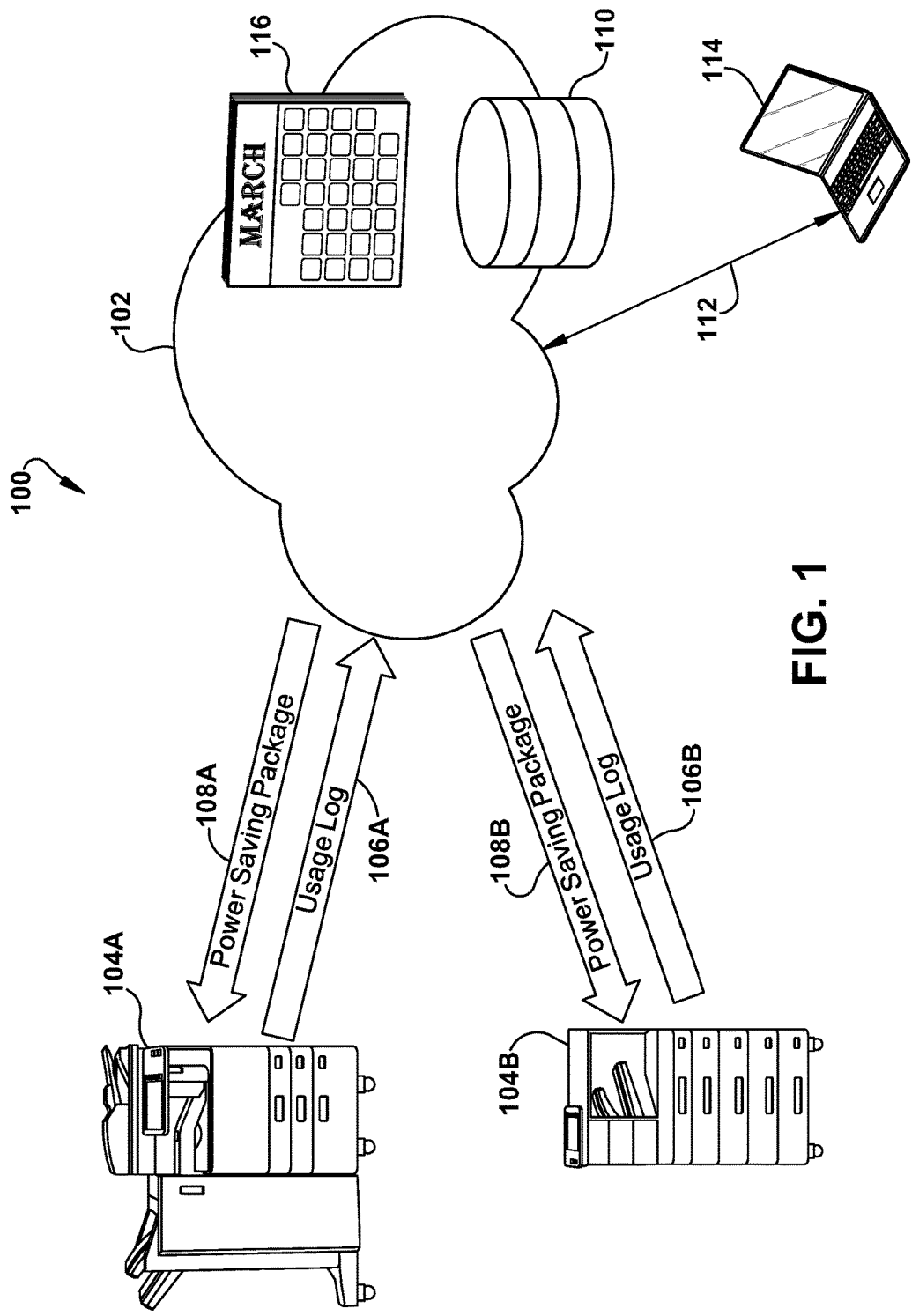
FIG. 1 is an example embodiment of a network with multifunction devices with power scheduling policies.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Document processing devices are employed by users for multiple tasks, including the printing of documents. Suitable document processing devices include scanners, copiers, printers, plotters and fax machines. More recently, two or more of these functions are contained in a single device or unit, referred to as a multifunction peripheral (MFP) or multifunction device (MFD), which may also serve as an e-mail or other information routing gateway. As used herein, MFP includes any device having one or more document processing functions such as those noted above. While example embodiments described herein refer to MFPs, it will be appreciated that they may be also applied to single use devices, such as a printer.

MFPs consume power when in the normal or awake mode. One source of power consumption is the toner fuser element which is heated to a temperature sufficient to melt toner particles and fuse the toner to paper. To reduce the amount of power being consumed by an MFP, the MFP can enter a power saving mode if not in use for a pre-determined period of time. During power saving modes the fuser can be allowed to cool and other electronics can be put into sleep or one or more low power modes. However, administrators may not know the typical patterns of usage by users of any particular MFP, and therefore may not configure the normal and sleep modes to maximize the energy efficiency of MFPs while also avoiding inconveniencing users who may have to wait for MFPs to wake from power saving modes in order to use them.

The present disclosure allows the power saving policy for an MFP to be individually tailored based on statistical data device from actual usage. Usage logs from the MFP can be sent to a power policy server. For example, usage logs can include usage data from the last 30 days. The usage data can be time-based usage data. The usage data can include timestamps for each time the MFP was used. The power policy server can generate a power saving policy for the MFP based at least in part of the patterns of usage by the MFP. The power policy server can send the power saving policy to the MFP, and the MFP can execute the power saving policy. An administrator can overwrite or adjust the power policy.

Additionally, company schedules can be imported and used to adjust the power saving policies for one or more MFPs. Company schedules can include scheduled holidays or company holiday, weekend or weekday schedules, employee work schedules, and schedules of electricity costs. Schedules of electrical costs can include hourly electrical rates that have been negotiated with electrical power providers, as well as quotas from electrical power providers usage limits set in accordance with company goals policies. Schedules can include information about whether locally generated power is available for use. For example, on days where locally generated solar or wind power is not available, MFPs can be configured to go into low power mode more frequently that when locally generated power is available. In a configuration, the power saving policy can be updated on the MFP on a more granular level, such as updating power saving policies when locally generated power becomes available, and setting polices based upon whether locally stored power reserves are available from off-peak charging.

Turning now to FIG. 1, a document processing system 100 is presented. The document processing system 100 includes a network 102 that is in data communication with one or more document processing devices, suitably comprised of MFP 104A and MFP 104B (collectively MFPs 104) as illustrated. MFPs 104, are suitably operable for printing, faxing, scanning, copying, e-mailing, or any other document processing operation will be understood by one of ordinary skill in the art. MFPs 104 include a user interface and are suitably managed by embedded controller as will be detailed further below. User interaction is suitably provided locally or remotely with any suitable computing devices, such as computers, tablets, PDAs, smartphones, or the like.

In the example embodiment of FIG. 1, MFPs 104 are coupled for data communication 106A, 106B, 108A, 108B using network 102. Data communications 106A, 106B include the transmission of usage logs from the MFPs 104 to a power scheduling server 116. Data communications 108A, 108B include the transmission of power saving packages from the power scheduling server 116 to MFPs 104. The MFPs 104 are also coupled for data communication using network 102 for the transmission of print jobs and other status messaging (not shown.) Network 102 suitably comprises a local area network (LAN), a remote local area network (RLAN), a wide area network (WAN) which may comprise the Internet, or any combination thereof. In an embodiment, the usage data can be time-based usage data. The usage data can indicate whether the MFP 104 has been used in a particular time slot. For example, usage data can be based on 24 hour time slots where the usage data indicates whether or not the MFP 104 was used in each hourly time slot. In an embodiment, the usage data can include time stamps that indicate the time the MFP 104 was used. In an embodiment, the usage data can include additional information, for example what service of the MFP was used, for example printing, faxing, scanning, email, and so forth. In an embodiment, the usage date can identify the user of the MFP. In an embodiment, the usage logs can be transmitted periodically, for example once an hour, or once a day. In an embodiment, the power scheduling server 116 polls the MFPs 104 for usage data.

Figure 2:
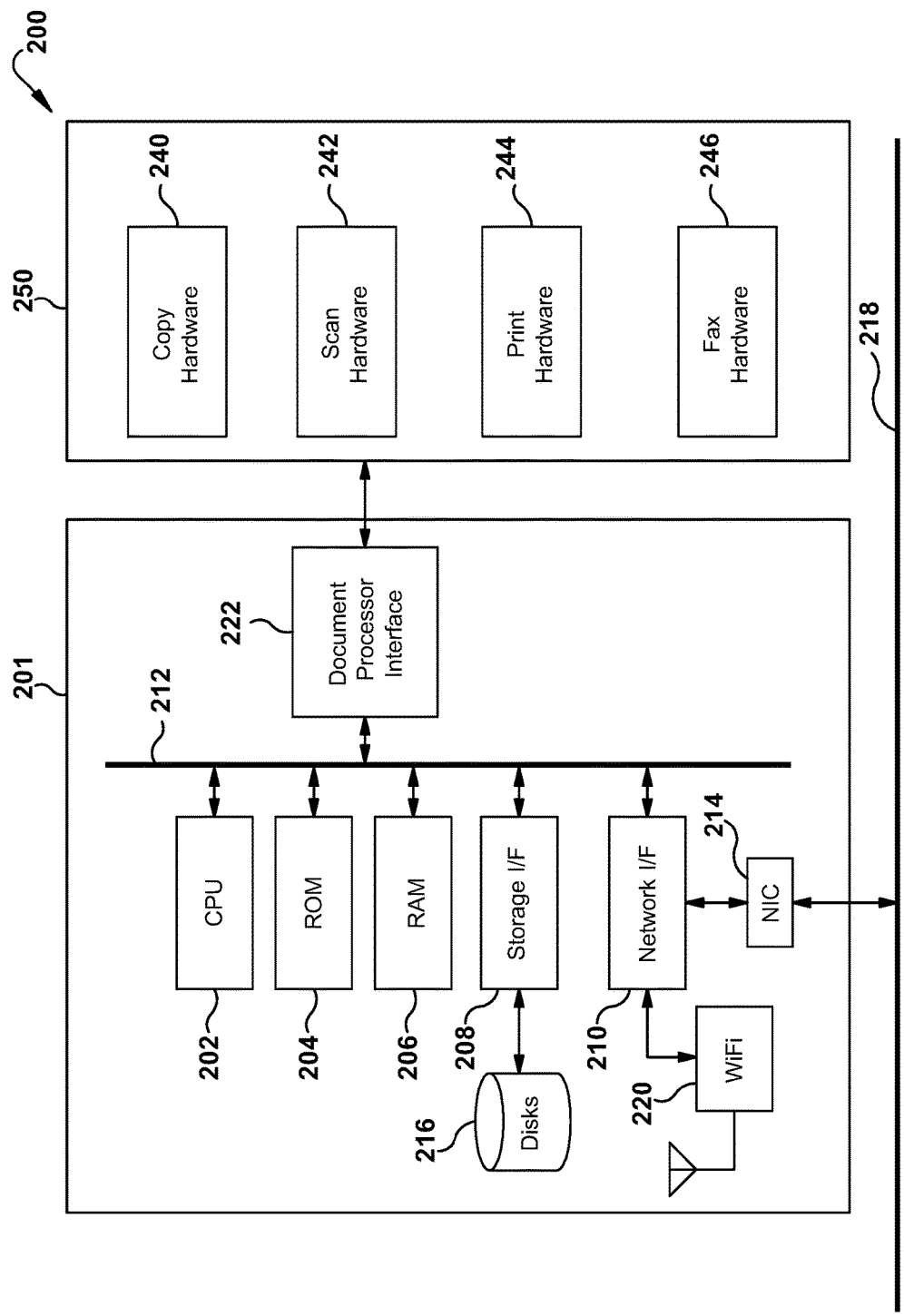
FIG. 2 is a block diagram of an example embodiment of a document processing device.

Turning now to FIG. 2, presented are functional components 200 suitably comprising a multifunctional peripheral such as MFP 104 of FIG. 1. Included is an example embodiment of controller 201 which is suitably comprised of a computer. Included in example controller 201 are one or more processors, such as illustrated by central processor unit (CPU) 202. Also included are non-volatile memory, such as read-only memory (ROM) 204, random access memory (RAM) 206, a storage interface 208, and a network interface 210. In the example embodiment, CPU 202, ROM 204, RAM 206, storage interface 208, and network interface 210, are in mutual data communication via bus 212. Storage interface 208 facilitates data access with bulk data storage, such as one or more disks 216, or any other suitable data storage such as a flash drive, solid state storage drive, CD, DVD or the like. Network interface 210 suitably provides for external data communication, such as with a network interface connection (NIC) 214 or WiFi interface 218. NIC 214 or WiFi interface 218 suitably provide for connection to an associated network 220. A document processor interface 222 is also in data communication with bus 212, and provides a gateway to copy hardware 224, scan hardware 226, print hardware 228 and fax hardware 230 which together comprise MFP functional hardware 232.

Figure 3:
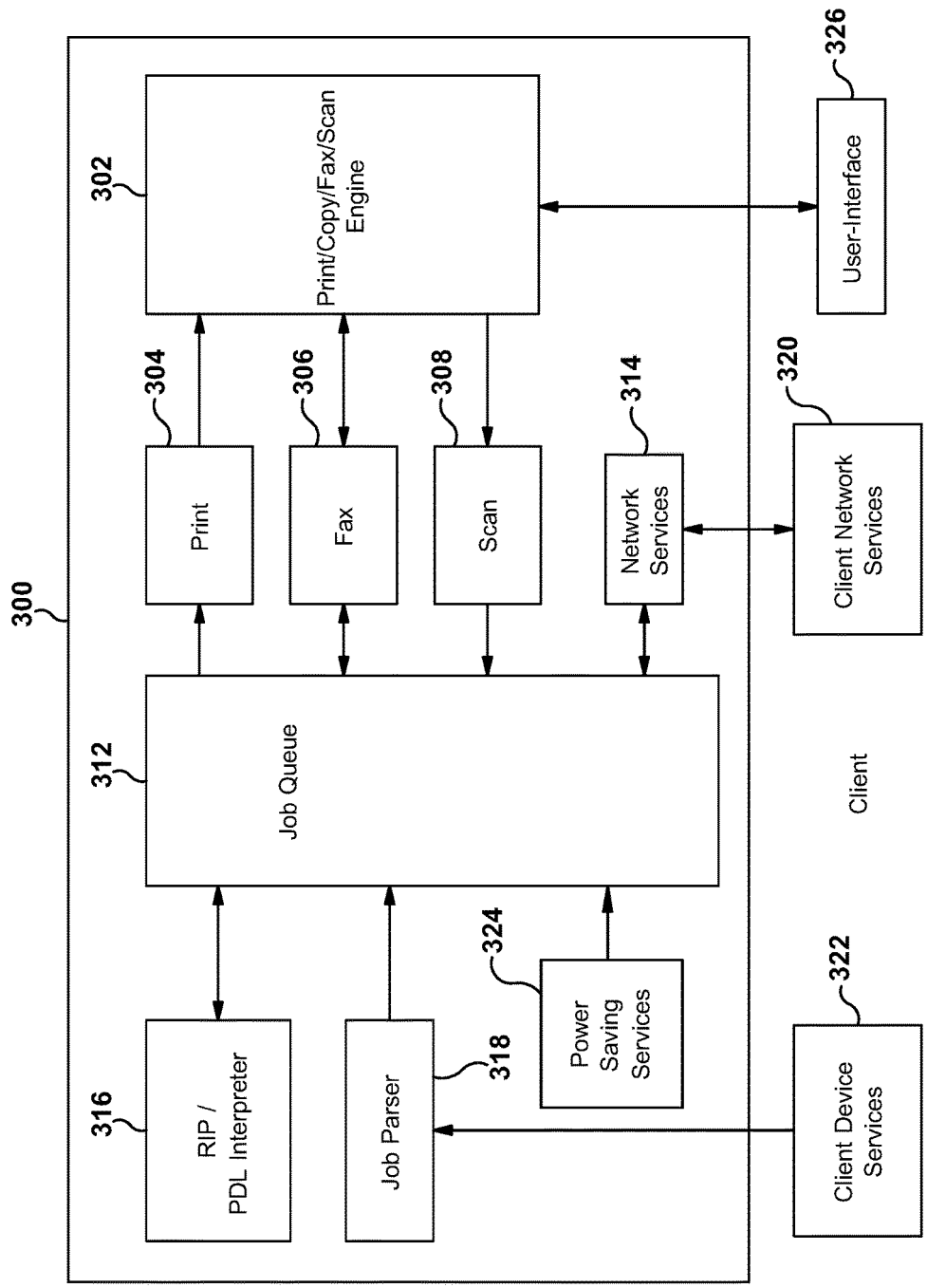
FIG. 3 is a block diagram of an example embodiment of document processing device functionality.

Turning now to FIG. 3, illustrated is a functional block diagram 300 of an example MFP. Included is a print/copy/fax/scan engine 302 which interfaces with print control 304, fax control 306, scan control 308, and email services 310 all of which are suitably interfaced with job queue 312. Email services 310 is suitably interfaced with network services 314. Print/copy/fax/scan engine 302 is suitably provided with user access via user interface 326. Job queue 312 is suitably interfaced with raster image processor (RIP) and page description language (PDL) functionality 316, as well as job parser 318. Job parser 318 is suitably interfaced with client device services 322. Job queue 312 is suitably interfaced with network services 314, which in turn is interfaced with client network services 320. Power saving service 324 is suitably interfaced with job queue 312. Power saving service 324 can place the MFP into a sleep or deep sleep mode based at least in part on jobs in the job queue 312 and/or a power saving policy. In embodiments, power saving service 324 can be suitably interfaced with network service 314, user interface 326, print/copy/fax/scan engine 302, and job parser 318.

Figure 4:
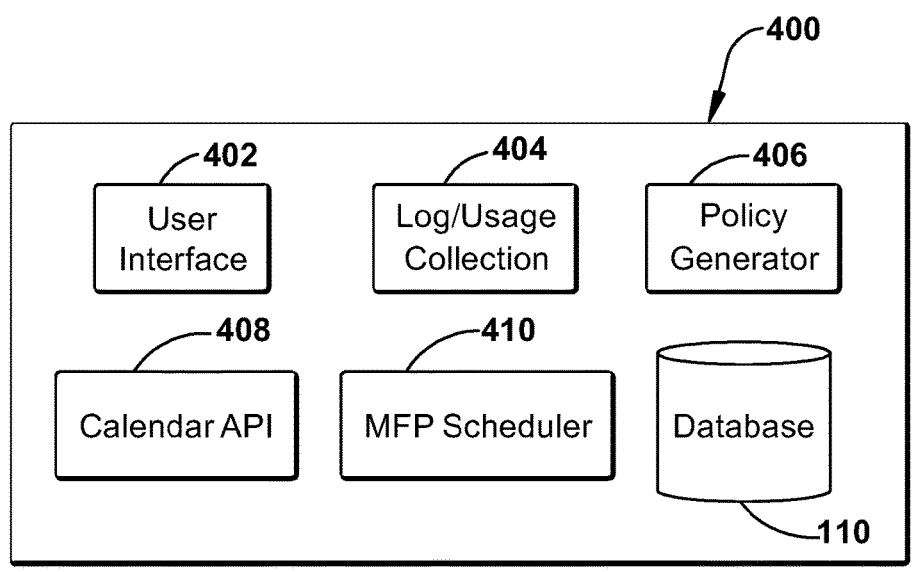
FIG. 4 is a functional block diagram of example modules of a power scheduling system.

Turning now to FIG. 4, presented are example software modules of a power scheduling server for generating power saving policies for MFPs. A UI module 402, or user interface module, allows a system administrator to view the current power saving policy for a selected MFP or group of MFPs. The system administrator can modify the power saving policy. An example power saving policy is described in greater detail below. A log/usage collection module 404 collects logs or usage data from one or more MFPs. A calendar API 408, or application programming interface, can import a company calendar or other scheduling information about employees that provides information about project usage patterns of employees. For example, the company calendar can include holidays when employees are unlikely to be working. In another example, the calendar information can include one or more schedules of electrical costs, such as actual hourly electrical costs, company electrical usage quotas or ecofriendly policies, locally generated power availability, and so forth. In a configuration, a system administrator can enter calendar or schedule information via the user interface 402. A policy generator 406 can generate a power saving policy for an MFP based upon historical usage data. The policy generator 406 also can generate the power saving policy using calendar information, schedules of electricity costs, employee schedule information, and other available data suitable for predicting future usage of the MFP. Example rules for generating power saving policies are described below in greater detail. An MFP scheduler module 410 can transmit power saving polices to MFPs which execute the power saving policies. The power saving polices, logs, usage data, calendar, electrical costs and quotas, employee information, MFP identifying information, and other data can be stored in a suitably configured database 110 or data store.

Figure 5:
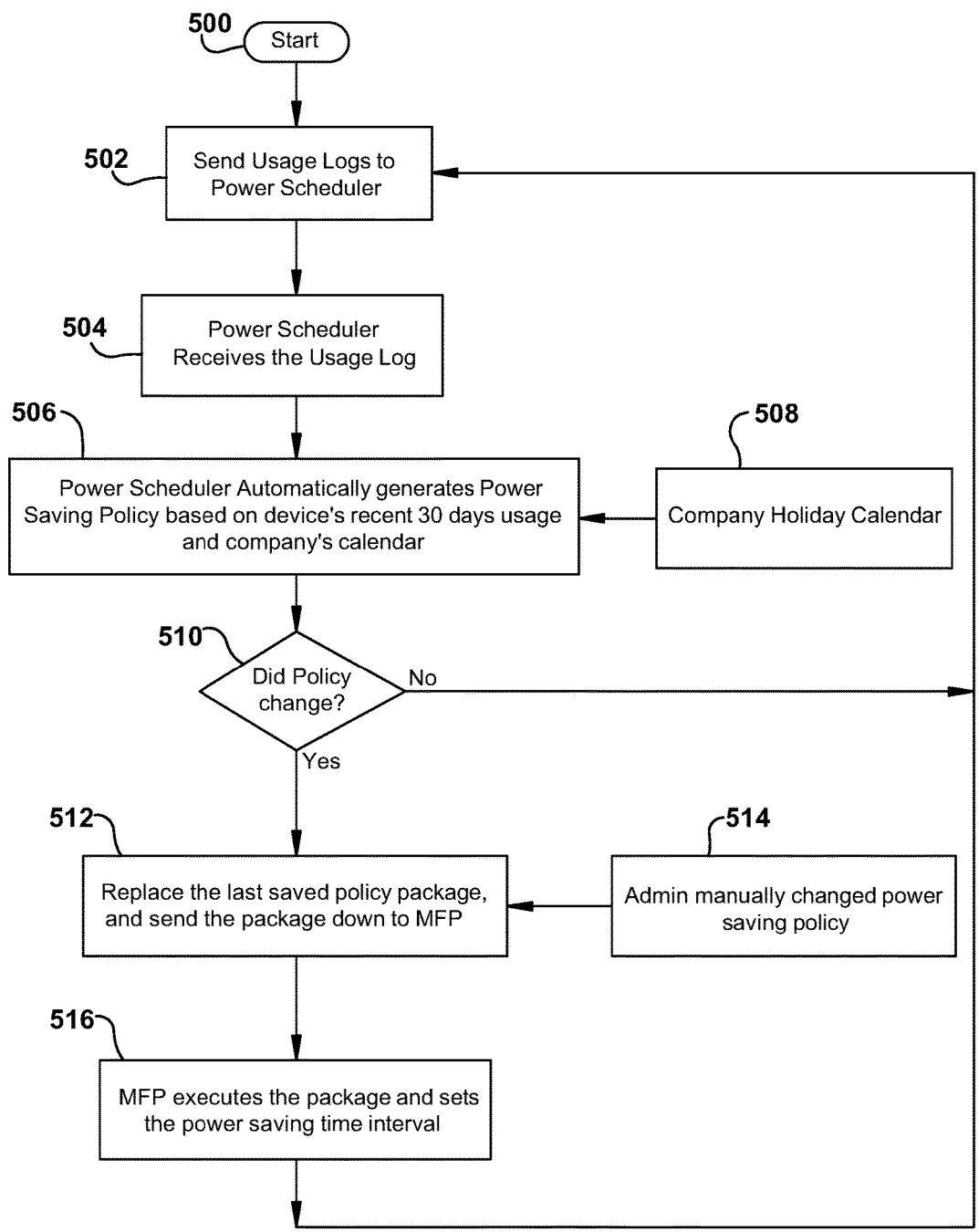
FIG. 5 is a flowchart of example operations of an embodiment of a document processing device with power scheduling.

Referring now also to FIG. 5, an example flowchart of operations for scheduling power saving modes on MFPs is presented. Processing starts at process block 500 labeled "START" and continues to process block 502.

In process block 502, each MFP sends usage data, for example a 30 day log of timestamped actions performed by the MFP, to the power scheduling server. In an embodiment each MFP periodically sends usage data to the power scheduling server. In an embodiment, the power scheduling server polls each MFP. As described above, the usage data can be time-based usage data, for example an indication as to whether an MFP was used during a particular hourly time slot. In an embodiment, the usage data indicates whether the MFP was used or not in each time slot over an interval of one or multiple days. For example, each MFP can provide an indication of whether the MFP was used in each time slot over an interval of one day, one week, thirty days, the current month, multiple months, or any configured interval of time. Processing continues to process block 504.

In process block 504, the power scheduling server receives the usage data from one or more MFPs. The usage data can be stored in suitable database. The usage data that is stored can be further processed. For example, the received usage data can include time-stamped usage entries of each time the particular MFP was used, as well as which function or service the MFP performed such as printing, faxing, scanning, emailing and so forth. The power scheduling server can process the usage data into a desired format, for example by breaking each day's usage into 24 hour time slots and determining whether an MFP was used during a particular hourly time slot. Processing continues to process block 506.

In process block 506, the power scheduling server generates a power saving policy for the MFP based on the usage data, or log, of the MFP. In an embodiment, the power scheduling server optionally imports scheduling information, for example a company holiday calendar or a schedule of electrical costs, in process block 508. In this embodiment, the power scheduling server can generate the power saving policy from the usage data and the company holiday calendar or other scheduling data as described above. Processing continues to decision block 510.

In decision block 510, if the power saving policy has changed, then processing continues to process block 512, otherwise processing continues back to process block 502.

In process block 512, the updated power saving policy is store to the database and transmitted to the MFP. In an embodiment, if a system administrator has added or modified a power saving policy in process block 514, then the system administrator's power saving policy is saved and transmitted to the MFP. Processing continues to process block 516.

In process block 516, the MFP receives the power saving package from the power scheduling server and executes the power saving package to set the power saving time intervals on the MFP. Processing continues to process block 502.

Figure 6:
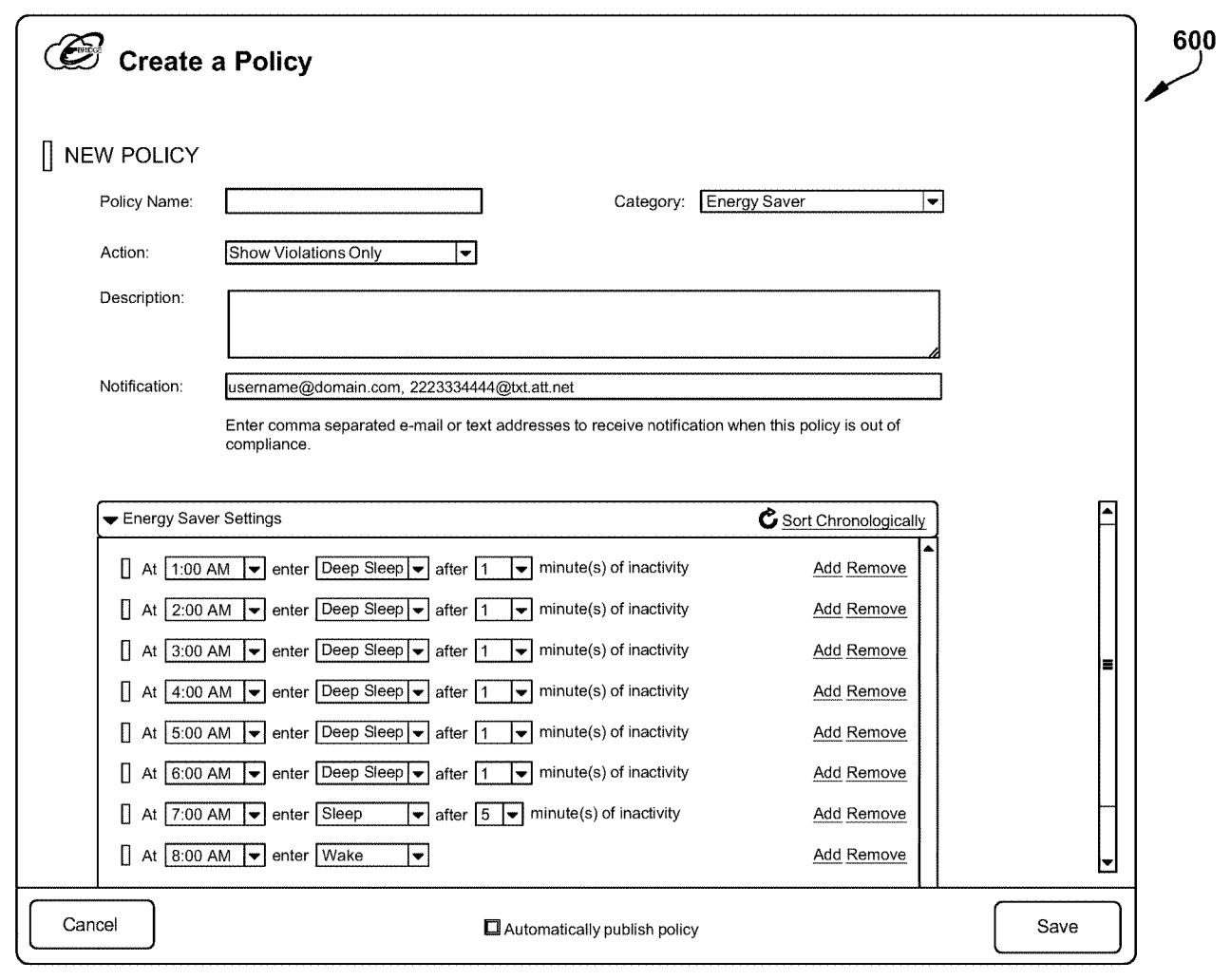

Referring now to FIG. 6, an example power saving policy 600 is presented. The power saving policy 600 can be generated by the power scheduler based on logs, usage data, calendar information, electrical costs and quotas, employee information, and so forth. The power saving policy 600 also can be created or modified by a system administrator.

The MFPs send usage logs and data to the power scheduling server, which implements rules for generating the power saving policy. In an embodiment, one or more MFPs can perform the operations of the power scheduling server, however the use of a power scheduling server advantageously allows centralized management of multiple MFPs, and centralized storage of usage logs and data in a database separate from the MFPs.

In an embodiment, the power scheduling server can calculate the usage of each MFP based on a predetermined period or interval of time, for example the previous day, an interval of a week, an interval of thirty days, the previous or current month, or any other suitable interval of time. The power scheduling server can divide each day into 24 time slots corresponding to hours in the day. Other time granularities for the time slots can similarly be used. The power scheduling server calculates the average of thirty days of usage for each of the time slots. The averaging can be based upon days of the week, and take into consideration weekdays and weekends. The power scheduling server generates rules for the power saving policy based upon the usage data. A first example rule of a power saving policy is, "if the MFP was used in current time slot and the previous time slot, then set the MFP to 'sleep' after 15 minutes of inactivity". A second example rule is, "if the MFP was used in the last time slot, but not the current time slot, then set the MFP to 'sleep' after 5 minutes of inactivity". A third example rule is, "if the MFP has no usage for two consecutive time slots, set the MFP to 'deep sleep' after 1 minute of inactivity". A fourth example rule is, "based on the previous first usage for each day of the week, set the MFP to 'wake' 15 minutes before the first usage". When the calendar is imported, a fifth example rule is, "if it is a company holiday or weekend, set the MFP to 'deep sleep'". A sixth example rule is, "if the current time slot is designated as a peak-electrical cost time slot, then set the MFP to 'sleep' after 1 minute of inactivity, otherwise set the MFP to 'sleep' after 5 minutes of inactivity". Other suitable rules can be used to implement a desired power saving policy.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A document processing device, comprising:
an embedded controller including a processor, a memory in data communication with the processor, and a network interface in communication with the processor, the memory operable for storage of data and instructions, and the network interface configured for data communication with a power scheduling server via an associated network,
wherein the processor is configured to
store a log of usage data associated with one or more of scanning, faxing, or printing by the document processing device,
transmit, via the network interface to a power scheduling server, the usage data,
receive, via the network interface from the power scheduling server and in response to transmitting the usage data, an updated power saving policy based at least in part on the transmitted usage data and one or more events from a calendar selected from the group consisting of a holiday, a company holiday, a day of the week, employee schedules, and a schedule of electricity costs,
execute the updated power saving policy for setting the operational state of the document processing device based on usage, and
perform a change in operational state based on usage.

2. The document processing device of claim 1, wherein log of usage data includes entries of usage of the document processing device based on 24 hour time slots.

3. The document processing device of claim 1, wherein the usage data includes time stamped entries of usage of the document processing device.

4. The document processing device of claim 1, wherein the operational state is one of awake, sleep, and deep sleep.

5. The document processing device of claim 1, wherein the updated power saving policy is further based at least in part on one or more events from a calendar.

6. The document processing device of claim 5, wherein each event from the calendar is selected from the group consisting of a holiday, a company holiday, a day of the week, employee schedules, and a schedule of electricity costs.

* * * * *